(12) United States Patent
Destribats et al.

(10) Patent No.: US 11,632,967 B2
(45) Date of Patent: Apr. 25, 2023

(54) FOOD COMPOSITION

(71) Applicant: SOCIETE DES PRODUITS NESTLE S.A., Vevey (CH)

(72) Inventors: Mathieu Julien Destribats, Lutry (CH); Julien Philippe Nicolas Mahieux, Jougne (FR); Joydeep Ray, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 243 days.

(21) Appl. No.: 16/620,282

(22) PCT Filed: Jun. 6, 2018

(86) PCT No.: PCT/EP2018/064884
§ 371 (c)(1),
(2) Date: Dec. 6, 2019

(87) PCT Pub. No.: WO2018/224543
PCT Pub. Date: Dec. 13, 2018

(65) Prior Publication Data
US 2020/0196623 A1 Jun. 25, 2020

(30) Foreign Application Priority Data

Jun. 7, 2017 (EP) .................... 17174749

(51) Int. Cl.
*A23D 9/02* (2006.01)
*A23D 9/007* (2006.01)
*A23L 33/12* (2016.01)
*A23L 33/17* (2016.01)
*A23L 33/19* (2016.01)
*A23L 33/125* (2016.01)
*A23D 7/005* (2006.01)
*A23D 9/05* (2006.01)
*A23G 1/32* (2006.01)

(52) U.S. Cl.
CPC .......... *A23D 9/007* (2013.01); *A23D 7/0053* (2013.01); *A23D 9/05* (2013.01); *A23G 1/32* (2013.01); *A23L 33/12* (2016.08); *A23L 33/125* (2016.08); *A23L 33/17* (2016.08); *A23L 33/19* (2016.08); *A23V 2002/00* (2013.01)

(58) Field of Classification Search
CPC ............ A23V 2002/00; A23V 2250/18; A23V 2250/194; A23V 2250/00; A61K 2300/00; A23L 27/80; A23L 2/39; A23L 3/46; A23L 33/12; A23L 33/17; A23L 33/19; A23L 33/125; A23D 9/007; A23D 7/0053; A23D 9/05; A23D 9/02
See application file for complete search history.

(56) References Cited

U.S. PATENT DOCUMENTS

| 2005/0123667 A1 | 6/2005 | Sakuma et al. |
| 2008/0095907 A1 | 4/2008 | Augustin et al. |
| 2016/0143312 A1* | 5/2016 | Chandrasekaran ...... A23G 1/44 426/611 |

FOREIGN PATENT DOCUMENTS

| EP | 1616486 | 1/2006 |
| EP | 1736059 | 12/2006 |
| EP | 1925211 | 5/2008 |
| JP | 2014501115 A | 1/2014 |

OTHER PUBLICATIONS

Classic and High-Oleic Canola Oils, Canolainfo.org, retrieved online Jun. 28, 2022, printed on Sep. 2007. https://www.canolacouncil.org/download/208/about-canola/4168/classic_and_high-oleic_canola_oils (Year: 2007).*
Japanese Office Action for Japanese Appl No. P2019-563180 dated Apr. 26, 2022.

* cited by examiner

*Primary Examiner* — Hong T Yoo
(74) *Attorney, Agent, or Firm* — K&L Gates LLP

(57) ABSTRACT

The present invention relates to food compositions, in particular food compositions comprising a dispersion of particles in a continuous fat phase, the particles comprising fat droplets dispersed within an amorphous continuous phase. Further aspects of the invention are a process for manufacturing a food composition and the use of particles comprising fat droplets dispersed in an amorphous continuous phase to reduce the sucrose content and/or the saturated fatty acid content of a fat-continuous confectionery product.

10 Claims, 5 Drawing Sheets

A

B

C

D

A

B

C

D

A

B

A

B

FOOD COMPOSITION

CROSS REFERENCE TO RELATED APPLICATIONS

The present application is a National Stage of International Application No. PCT/EP2018/064884, filed on Jun. 6, 2018, which claims priority to European Patent Application No. 17174749.6, filed on Jun. 7, 2017, the entire contents of which are being incorporated herein by reference

FIELD OF THE INVENTION

The present invention relates to food compositions, in particular food compositions comprising a dispersion of particles in a continuous fat phase, the particles comprising fat droplets dispersed within an amorphous continuous phase. Further aspects of the invention are a process for manufacturing a food composition and the use of particles comprising fat droplets dispersed in an amorphous continuous phase to reduce the sucrose content and/or the saturated fatty acid content of a fat-continuous confectionery product.

BACKGROUND OF THE INVENTION

The increasing interest in reduced sugar intake in the diet by health conscious consumers has led to a strong demand for food products with lower amounts of sugar. Sugar, however, is a key food ingredient that in addition to imparting natural sweetness to food products also functions to provide bulk and therefore plays a significant role in the structure, volume and mouthfeel of the finished food product.

Sucrose is a naturally occurring sugar sweetener that provides the sweetness in food products that consumers crave but is also highly calorific and so there is an important need for healthier, non-caloric or low-caloric sweetener alternatives. There have been many approaches that are well known in the art, involving the replacement or reduction of sugars in food products such as for instance using artificial sweeteners or sugar alcohols to replace natural sugar (sucrose). Other approaches have included using bulking agents such as, no- or low-caloric fibres to replace sucrose. These approaches however, have associated disadvantages, for instance many sugar alcohols are known to have undesirable laxative effects and furthermore artificial sweeteners are not well perceived by consumers who have a preference for clean label products. There are also certain disadvantages linked to the use of bulking agents to replace sucrose in food products this is mainly the associated undesirable impact on sweetness usually a reduction in sweetness.

Thus, it is generally well known to those skilled in the art of food manufacturing that replacing or reducing sugar in a food composition usually negatively impacts the flavour, and other taste components. For instance, sugar replacers may be slower in onset of the sweetness perception and longer in duration compared to natural sugar and so therefore change the taste balance of a food composition.

In addition sugar replacers may not deliver as sweet a taste as natural sugar and may also exhibit, metallic, cooling, astringent, liquorice-like, and bitter after tastes.

There is a need in the industry to provide sweet tasting food compositions with lower levels of sugar without having a detrimental impact on the sweetness perception and/or any of the above associated problems of the prior art solutions.

It would be desirable if such food compositions contained ingredients that consumers were familiar with, and were free from artificial sweeteners.

Fats used in consumer products such as foods need to be stable against oxidation. Rancidity of the fat is perceived as a severe defect of the product. The requirement of having stable fats leads to the use of highly stable saturated oils, for example fully hydrogenated palm kernel oil. Since a high consumption of saturated fatty acids (SFA) has been associated with increased risk of cardiovascular diseases, authorities and consumers require SFA reduction in food products. Essential fatty acids such as omega-3 fatty acids are beneficial in the diet, but these unsaturated fats are sensitive to oxidation and so their use in food products is limited. In order to stabilize less-saturated fats in food products, highly effective synthetic antioxidants may be added, but this is not always desirable to consumers who seek products with familiar ingredients of natural origin.

Fat-based confectionery fillings are often high in low-melting fats such as nut oils. When such fillings are placed in contact with chocolate, the low-melting fats tend to migrate into the fat-phase of the chocolate. This leads to a softening of the chocolate and can cause the formation of fat bloom on the chocolate surface. Many approaches have been proposed over the years to tackle this problem, for example the incorporation of barrier layers between the filling and the chocolate (EP1471797) or the use of anti-bloom additives (EP0521549). However, for an indulgent chocolate filled with a nut paste, consumers do not expect the product to contain non-traditional ingredients, for example they may just want to see ingredients such as chocolate, nuts, milk and sugar. It would be advantageous to be able to provide a confectionery filling, rich in nut oil which does not migrate into an adjacent chocolate layer without having to introduce ingredients that consumers do not expect to find in confectionery fillings, or to introduce additional components such as barrier layers to the product.

Hence, there is a clear need in the art to find better solutions to provide stabilized fats, both stabilized against oxidation and stabilized against migration, in particular using components which do not adversely affect the organoleptic properties of the fats and which are perceived as natural by consumers.

An object of the present invention is to improve the state of the art and to provide an improved solution to overcome at least some of the inconveniences described above or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

SUMMARY OF THE INVENTION

Accordingly, the present invention provides in a first aspect a food composition comprising a dispersion of particles in a continuous fat phase, the particles comprising fat droplets dispersed within an amorphous continuous phase, wherein the solid fat content of the droplets is less than 25%. In a second aspect the invention relates to a process for manufacturing a food composition comprising the steps of a)

forming an oil-in-water emulsion comprising fat, a sweetener, a bulking agent and a colloid stabilizer; b) optionally subjecting the emulsion to high pressure, for example 50 to 300 bar, for further example 100 to 200 bar; c) optionally adding gas to the emulsion; d) spraying and drying the emulsion to form amorphous particles comprising oil droplets; and e) mixing the amorphous particles with fat. In a third aspect, the invention provides the use of particles comprising fat droplets dispersed in an amorphous continuous phase, the continuous phase comprising a sweetener, a bulking agent and optionally a surfactant, for reducing the sucrose content and/or the saturated fatty acid content of a fat-continuous confectionery product. In a further aspect, the invention provides an edible powder comprising particles, the particles comprising fat droplets and an amorphous continuous phase, the fat droplets being dispersed in the amorphous continuous phase and having a solid fat content of less than 25%, wherein the amorphous continuous phase comprises sucrose, a bulking agent and a colloidal stabilizer.

It has been surprisingly found by the inventors that amorphous porous particles may advantageously be used to enclose low-melting fats. When the particles are dispersed in a fat continuous matrix such as a confectionery filing the low-melting fat is protected from oxidation and is also prevented from migrating through the fat continuous matrix. Surprisingly, for sweet food compositions comprising sucrose, when the amorphous porous particles comprise sucrose in the amorphous state, the overall level of sucrose in the confectionery food composition can be reduced without having a detrimental effect on the sweetness. Crystalline sucrose can be replaced by the amorphous particles comprising sucrose in the amorphous state and dispersed droplets of fat. At equivalent volumes, amorphous particles gave at least equivalent sweetness compared to conventional crystalline sucrose.

DETAILED DESCRIPTION OF THE INVENTION

Figure 1:
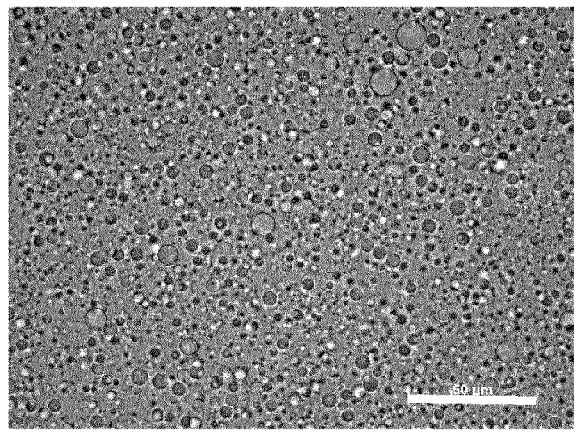
FIG. 1 shows optical light micrographs of the emulsions of example 1 before spray drying. Scale bar is 50 µm.
Figure 1:
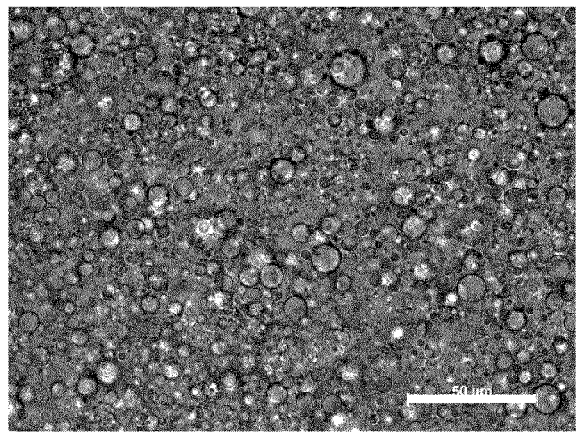
Figure 1:
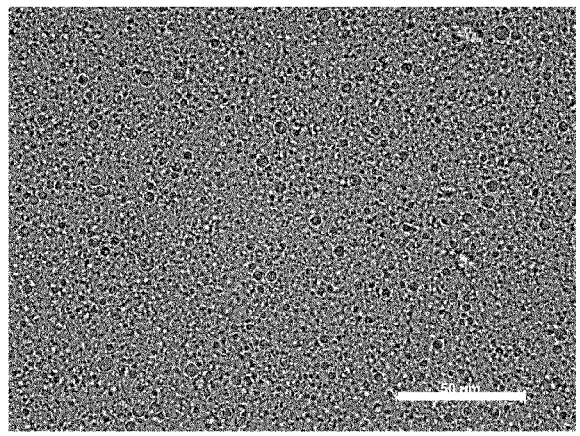
Figure 1:
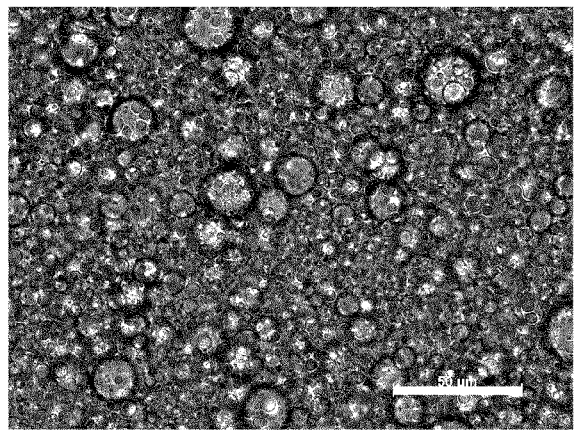

Consequently the present invention relates in part to a food composition comprising a dispersion of particles in a continuous fat phase, the particles comprising fat droplets dispersed within an amorphous continuous phase, wherein the solid fat content of the droplets is less than 25% (for example the solid fat content of the droplets may be less than 25% at 20° C.). The solid fat content of the droplets may for example be less than 10% (e.g. at 20° C.) for example less than 5% (e.g. at 20° C.), for further example the solid fat content of the droplets may be zero (e.g. at 20° C.). The solid fat content may be measured by pulsed NMR, for example according to the IUPAC Method 2.150 (tempered). The particles may comprise between 5 and 60 wt. % fat droplets, for example between 10 and 50 wt. % fat droplets. The fat droplets may have a particle size distribution D90 of between 500 nm and 30 µm. The fat droplets may be dispersed directly in the amorphous continuous phase, that is to say the exterior surface of the fat droplet is in contact with the amorphous continuous phase, or is separated from the amorphous continuous phase by a very thin layer (for example thinner than 10 microns, for example thinner than 1 micron), such as a layer of emulsifier molecules or other colloidal stabilizer such as a Pickering stabilizer.

In the context of the present invention, the term fat refers to triglycerides. Fats are the chief component of animal adipose tissue and many seeds. Fats which are generally encountered in their liquid form are commonly referred to as oils. In the present invention the terms oils and fats are interchangeable. The melting point of a fat may for example be the temperature at which it has a 1% solid fat content as measured by pulsed NMR.

Amorphous particles may be present in the food composition of the invention at a level of between 1 and 50 wt. %, for example between 5 and 40 wt. %, for further example between 10 and 30 wt. %.

According to the present invention the term 'amorphous' as used herein is defined as being a glassy solid, essentially free of crystalline material. According to the present invention the term glass transition temperature (Tg) as used herein is to be interpreted as is commonly understood, as the temperature at which an amorphous solid becomes soft upon heating. The glass transition temperature is always lower than the melting temperature (Tm) of the crystalline state of the material. An amorphous material can therefore be conventionally characterised by a glass transition temperature, denoted Tg. A material is in the form of an amorphous (glassy) solid when it is below its glass transition temperature. Several techniques can be used to measure the glass transition temperature and any available or appropriate technique can be used, including differential scanning calorimetry (DSC) and dynamic mechanical thermal analysis (DMTA).

In an embodiment of the present invention the amorphous continuous phase of the particles is characterised as having a glass transition temperature of at least 40° C., preferably at least 50° C. and more preferably at least 60° C.

The solid fat content of the continuous fat phase of the food composition of the invention may be greater than 30% (for example the solid fat content of the droplets may be greater than 30% at 20° C.). The solid fat content of the continuous fat phase of the food composition of the invention may for example be greater than 40% (e.g. at 20° C.), for example greater than 50% (e.g. at 20° C.). The solid fat content may be measured by pulsed NMR, for example according to the IUPAC Method 2.150 (tempered). The introduction of softer, lower-melting fats (sometimes called liquid oils) into fat based food compositions often leads to quality problems as discussed above. For example, liquid oils may migrate from fat-based fillings into coating layers, liquid oils may make the products too soft and heat sensitive, liquid oils may prevent the proper crystallization of the fat, or oxidation of the liquid oils may occur. In the food composition of the invention, a low-melting fat may be isolated from a higher melting continuous fat phase. This provides a number of advantages. Liquid fats within the particles still contribute to the overall mouthfeel of the product but do not soften the continuous fat phase to the point where it is difficult to process, or where fat migration causes quality issues with other components. Liquid fats are protected from oxidation in the food composition of the invention. The saturated fatty acid content (on a total fat basis) of the food composition may be reduced, for example by using liquid fats with little or no saturated fatty acid content inside the particles. The fat droplets according to the food composition of the invention may be naturally flavoured oils such as nut oils. Composite confectionery products such as chocolate products consisting of a chocolate outer shell with a soft nut-containing filling are very popular. Such products are sometimes called "Belgian pralines". However, the nut oils migrate into the chocolate shell during storage and cause quality defects such as fat bloom. The food composition of the invention enables naturally flavoured oils such as hazelnut and almond oils to be incorporated into the fillings of such products without causing quality problems such as bloom. The amorphous continuous phase of the particles dissolves rapidly in the mouth when eaten, releasing the nut oil and providing the desired natural nut flavour.

In an embodiment, the amorphous continuous phase of the particles according to the invention comprises a sweetener, a bulking agent and optionally a surfactant. Without being bound by theory it is believed that particles comprising sweetener (for example sugar) in the amorphous state provide a material which dissolves more rapidly than crystalline sugar particles of a similar size. This rapid dissolution in the oral cavity when consumed leads to an enhanced sweetness perception and ensures that more of the sugar is dissolved and reaches the tongue rather than being swallowed untasted.

According to the present invention the term sweetener as used herein refers to substance which provides a sweet taste. The sweetener may be a sugar, for example a mono, di or oligo-saccharide. The sweetener may be selected from the group consisting of sucrose, fructose, glucose, dextrose, galactose, allulose, maltose, high dextrose equivalent hydrolysed starch syrup, xylose, and combinations thereof.

Accordingly, the sweetener comprised within the amorphous continuous phase of the particles according to the invention may be selected from the group consisting of sucrose, fructose, glucose, dextrose, galactose, allulose, maltose, high dextrose equivalent hydrolysed starch syrup xylose, and any combinations thereof. The sweetener may be sucrose.

In an embodiment the amorphous continuous phase of the particles according to the invention comprise sweetener (for example sucrose) in the amount of 5 to 70%, preferably 10 to 50%, even more preferably 20 to 40%.

In one embodiment the amorphous continuous phase of the particles according to the invention comprise at least 70% sweetener (for example sucrose).

In an embodiment, the invention provides a food composition comprising a dispersion of particles in a continuous fat phase, the particles comprising fat droplets dispersed within an amorphous continuous phase wherein the amorphous continuous phase of the particles comprises sucrose, a bulking agent and a surfactant.

According to the present invention the term bulking agent refers to a food ingredient that increases food volume or weight without significantly impacting flavour. The bulking agent comprised within the amorphous continuous phase of the particles according to the invention may be a material which increases food volume or weight without impacting the utility or functionality of a food. In an embodiment of the present invention, the bulking agents comprised within the amorphous continuous phase of the particles according to the invention are low or non-calorific additives which impart bulk and provide advantageously healthier alternatives to for example sucrose. The bulking agent may be a biopolymer, for example a sugar alcohol, saccharide oligomer or polysaccharide. In an embodiment, the bulking agent may not be a sugar alcohol, saccharide oligomer or polysaccharide which is as sweet or sweeter than crystalline sucrose on a weight basis.

In an embodiment, the amorphous continuous phase of the particles according to the invention comprise a bulking agent in the amount of 5 to 70%, for example 10 to 40%, for further example 10 to 30%, for still further example 40 to 70%.

In one embodiment, the amorphous continuous phase of the particles according to the invention comprise 10 to 25% of the bulking agent.

The bulking agent comprised within the amorphous continuous phase of the 1.0 particles according to the invention may be selected from the group consisiting of sugar alcohols (for example isomalt, sorbitol, maltitol, mannitol, xylitol, erythritol and hydrogenated starch hydrolysates), lactose, maltose, fructo-oligosaccharides, alpha glucans, beta glucans, starch (including modified starch), natural gums, dietary fibres (including both insoluble and soluble fibres), polydextrose, methylcellulose, maltodextrins, inulin, dextrins such as soluble wheat or corn dextrin (for example Nutriose®), soluble fibre such as Promitor® and any combination thereof.

The bulking agent comprised within the amorphous continuous phase of the particles according to the invention may be selected from the group consisting of lactose, maltose, maltodextrins, soluble wheat or corn dextrin (for example Nutriose®), polydextrose, soluble fibre such as Promitor® and any combinations thereof. The bulking agent comprised within the amorphous continuous phase of the particles according to the invention may be selected from the group consisting of soluble wheat or corn dextrin (for example Nutriose®), polydextrose, soluble fibre such as Promitor® and any combinations thereof. The bulking agent comprised within the amorphous continuous phase of the particles according to the invention may be lactose.

The particles dispersed in the continuous fat phase according to the invention may have a moisture content between 0.5 and 6 wt. %, for example between 1 and 5 wt. %, for further example between 1.5 and 3 wt. %.

In an embodiment, the amorphous continuous phase of the particles according to the invention comprise a colloid stabilizer, for example an emulsion stabilizer. The colloid stabilizer may be a finely divided solid stabilizing an emulsion by the Pickering effect, for example a finely divided solid having a particle size distribution D90 between 100 and 200 nm. The colloid stabilizer may be particles of protein, for example whey protein aggregates such as are described in EP1839492. The colloid stabilizer may be a surfactant. To form the amorphous continuous phase of the particles an aqueous solution may be dried or cooled to form a glass. A colloid stabilizer aids the formation of an oil-inwater emulsion in the aqueous solution, and the dispersed oil phase becomes the fat droplets in the particles according to the invention.

The colloidal stabilizer may be a polar lipid, for example a phospholipid or galactolipid. The colloidal stabilizer may be a lecithin selected from the group consisting of sunflower lecithin, soy lecithin and oat oil (for example fractionated oat oil).

In an embodiment, the amorphous continuous phase of the particles of the present invention comprises a surfactant in the amount of 0.5 to 15 wt. %, for example 1 to 10 wt. %, for further example 1 to 5 wt. %, for further example 1 to 3 wt. %. The surfactant may be selected from the group consisting of lecithin, whey proteins, milk proteins, non-dairy proteins, sodium caseinate, lysolecithin, fatty acid salts, lysozyme, sodium stearoyl lactylate, calcium stearoyl lactylate, lauroyl arginate, sucrose monooleate, sucrose monostearate, sucrose monopalmitate, sucrose monolaurate, sucrose distearate, sorbitan monooleate, sorbitan monostearate, sorbitan monopalmitate, sorbitan monolaurate, sorbitan tristearate, PGPR, PGE and any combinations thereof. For example, the surfactant may be sodium caseinate or lecithin.

It should be noted that bulking agents derived from milk powder such as skimmed milk powder inherently comprises the surfactant sodium caseinate. Whey powder (such as sweet whey) comprises whey protein.

The surfactant comprised within the amorphous continuous phase of the particles according to the present invention may be a non-dairy protein. In the context of the present invention the term "non-dairy proteins" refers to proteins that are not found in bovine milk. The primary proteins in bovine milk are caseins and whey proteins. Some consumers desire to avoid milk proteins in their diets, for example they may suffer from milk protein intolerance or milk allergy and so it is advantageous to be able to offer food products free from dairy proteins. The surfactant comprised within the amorphous continuous phase of the particles of the present invention may be selected from the group consisting of pea proteins, almond proteins, coconut proteins, potato proteins, wheat gluten, egg albumin proteins (for example ovalbumin, ovotransferrin, ovomucoid, ovoglobulin, ovomucin and/or lysozyme), clupeine, oat protein, soy proteins, tomato proteins, Brassicaceae seed protein and combinations of these. For example the non-dairy protein comprised within the amorphous continuous phase of the particles of the invention may be selected from the group consisting of almond protein, pea proteins, potato proteins, wheat gluten, soy proteins, and combinations of these. For further example the non-dairy protein comprised within the amorphous continuous phase of the particles of the invention may be almond protein or wheat gluten.

In an embodiment, the amorphous continuous phase of the particles according to the present invention may comprise a non-dairy protein in the amount of 0.5 to 15%, preferably 1 to 10%, more preferably 1 to 5%, even more preferentially 1 to 3%.

Some consumers wish to avoid dairy products in their diet. In an embodiment, the amorphous continuous phase of the particles according to the present invention may be free from milk ingredients. For example, the amorphous continuous phase of the particles according to the present invention may comprise sucrose; a bulking agent selected from the group consisting of maltose, maltodextrins, soluble wheat or corn dextrin, polydextrose, soluble fibre and combinations of these; and a surfactant selected from the group consisting of pea proteins, potato proteins, wheat gluten, egg albumin proteins, clupeine, soy proteins, tomato proteins, Brassicaceae seed protein and combinations of these. For further example, the amorphous continuous phase of the particles according to the present invention may comprise sucrose; a bulking agent selected from the group consisting of maltose, maltodextrins, soluble wheat or corn dextrin, polydextrose, soluble fibre and combinations of these; and a surfactant selected from the group consisting of pea proteins, potato proteins, wheat gluten, egg albumin proteins, clupeine, soy proteins, tomato proteins, Brassicaceae seed protein and combinations of these, the sucrose being present at a level of at least 30% in the particles, the ratio of sucrose to bulking agent being between 0.5 to 1 and 2.5 to 1 on a dry weight basis, for example between 0.6 to 1 and 1.7 to 1 on a dry weight basis. The amorphous continuous phase of the particles according to the present invention may comprise sucrose and wheat gluten or almond protein, for example where the sucrose is present at a level of at least 30 wt. % in the amorphous continuous phase. For further example the amorphous continuous phase of the particles according to the present invention may comprise sucrose, a bulking agent being maltodextrin or soluble fibre, and a plant protein being wheat gluten or almond protein. For further example, the amorphous continuous phase of the particles according to the present invention may comprise sucrose, a bulking agent being maltodextrin or soluble fibre, and a plant protein being wheat gluten or almond protein, the sucrose being present at a level of at least 30% in the particles, the ratio of sucrose to bulking agent being between 0.5 to 1 and 2.5 to 1 on a dry weight basis, for example between 0.6 to 1 and 1.7 to 1 on a dry weight basis. The fat droplets may comprise non-dairy fat, for example vegetable fat.

In an embodiment, the particles according to the present invention further comprise closed porosity, for example the amorphous continuous phase of the particles comprises closed porosity.

According to the present invention the term porous as used herein is defined as having multiple small hollow pores or voids. In the present invention the term porosity as used herein is defined as a measure of the empty spaces (or voids or pores) in a material and is a ratio of the volume of voids to total volume of the mass of the material between 0 and 1, or as a percentage between 0 and 100%

Porosity can be measured by means known in the art. For instance, the particle porosity can be measured by the following equation:

$$\text{Porosity} = Vp - Vcm/Vp \times 100 \text{ wherein } Vp \text{ is the Volume of the particle and } Vcm \text{ is the volume of the matrix or bulk material.}$$

According to the present invention the term closed or internal porosity as used herein refers in general terms to the total amount of void or space that is trapped within the solid. An internal micro structure wherein the voids or pores are not connected to the outside surface of the said particles. In the present invention the term closed porosity is further defined as the ratio of the volume of closed voids or pores to the particle volume.

Increasing the porosity of the particles increases their dissolution speed in water. This increased dissolution speed enhances the sweetness impact of the particles. However, increasing the porosity of the particles also increases their fragility. It is advantageous that the porous particles of the present invention exhibit closed porosity. Particles with closed porosity, especially those with many small spherical pores, are more robust than particles with open pores, as the spherical shapes with complete walls distribute any applied load evenly. When added to a soft food composition with a fat-continuous phase, closed porosity has a further advantage over open porosity in that fat does not penetrate inside the particle. If the fat from the continuous fat phase were to penetrate inside the porous particles it would reduce the "free" fat available to coat all the particles in the composition and lead to an increase in viscosity. Open porosity might also provide a route for the fat droplets inside the particles to escape, for example if dividing walls within the particle were to break.

The particles comprised within the food composition of the invention may have a closed porosity of between 10 to 60%, for example between 15 and 50%, for further example between 20 and 40%.

The matrix density of the particles may be determined by a density meter, for example a DMA 4500 M (Anton Paar, Switzerland AG). The apparent density of particles may be measured by a pycnometer, for example an Accupyc 1330 Pycnometer (Micrometrics Instrument Corporation, US).

Closed porosity is calculated from the matrix density and the apparent density, according to the following equation:

$$\text{Closed porosity} = 100 \cdot \left(1 - \frac{\rho_{apparent}}{\rho_{matrix}}\right)$$

The internal structure of the particles according to the invention may be examined using techniques such as Cryo-Scanning Electron Microscopy (Cryo-SEM) and synchrotron radiation X-ray tomographic microscopy (SRXTM). Image processing software may be used to calculate normalized specific surface. The porous particles according to an embodiment of the invention may have a normalized specific surface of between 0.05 and 0.18 $m^{-1}$, for example between 0.06 and 0.12 $m^{-1}$. The porous particles according to an embodiment of the invention may have a normalized specific surface of between 0.05 and 0.18 $m^{-1}$ (for example between 0.06 and 0.12 $m^{-1}$) and a particle size distribution D90 of between 30 and 60 μm. The normalized surface accounts for the surface of the pores (voids) as well as the external surface area. It does not consider the surface of the interface between the fat droplets and the continuous amorphous phase of the particles.

$$\text{Normalized specific surface} = \frac{\text{interstitial surface area of pores} + \text{external surface area of material}}{\text{non-gas volume of material}}$$

According to the present invention the term density is the mass per unit volume of a material. For porous powder, three terms are commonly used; apparent density, tap density and absolute density. Apparent density (or envelope density) is the mass per unit volume wherein pore spaces within particles are included in the volume.

Tap density is the density obtained from filling a container with the sample material and vibrating it to obtain near optimum packing. Tap density includes inter-particle voids in the volume whereas apparent density does not. In absolute density (or matrix density), the volume used in the density calculation excludes both pores and void spaces between particles.

In an embodiment of the present invention the particles according to the composition of the present invention have an apparent density of between 0.3 to 1.5 $g/cm^3$, preferably 0.5 to 1.0 $g/cm^3$, more preferably 0.6 to 0.9 $g/cm^3$ As previously described, the amorphous nature of the particles leads to faster dissolution in the mouth, this is further enhanced by porosity. The fast dissolution not only enhances sweetness impact but is believed to make the particles less easily detected by the tongue and palate. Advantageously the highly porous and amorphous nature of the particles of the composition of the present invention provides an enhanced sweetness and attractive mouthfeel, particularly in fat based filings and spreads where replacing sucrose with conventional bulking agents usually leads to poor organoleptic qualities, such as grittiness and lack of sweetness.

A surfactant comprised within the particles according to the composition of the invention aids not only stabilizes the formation of an oil-in-water emulsion as described above, but can aid the formation of porosity, in particular closed porosity. The surfactant comprised within the particles according to the composition of the invention (for example sodium caseinate) aids the formation of multiple internal pores which are spherical or nearly spherical in shape and are resistant to being ruptured during processing of the particles or the food composition comprising them.

Particles with closed porosity serve to aerate the food composition reducing its density. The aeration due to particles with closed porosity is stable against heat damage. In contrast, conventional air bubbles directly in the fat phase of a food composition are very susceptible to the fat melting. Aeration volume is often lost if the food composition is subjected to one or more heat cycles.

The porous nature of the particles in an embodiment of the invention may lead to them being lighter in colour than solid crystalline materials such as sucrose crystals. This can be counteracted by the addition of opaque or coloured materials. The particles of the invention may comprise coloured ingredients, for example caramelized sugars or permitted food colours, for example natural food colours.

The amorphous continuous phase of the particles according to the composition of the invention may comprise sweetener, bulking agent and surfactant, all distributed throughout the continuous phase of the particles. Higher concentrations of surfactant may be present at oil and/or gas interfaces than in the rest of the continuous phase but in an embodiment of the invention the surfactant is present inside the particles, not just coated onto the exterior. For example, the surfactant may be present in the interior of the particles according to the composition of the invention.

The particles comprised within the composition of the present invention may have a particle size distribution D90 of less than 90 microns, for example less than 80 microns, for further example less than 70 microns. The particles comprised within the composition of the present invention may have a particle size distribution D90 of between 25 and 90 microns, for example between 40 and 80 microns.

The D90 value is a common method of describing a particle size distribution. The D90 is the diameter where 90% of the mass of the particles in the sample have a diameter below that value. In the context of the present invention the D90 by mass is equivalent to the D90 by volume. The D90 value may be measured for example by a laser light scattering particle size analyser. Other measurement techniques for particle size distribution may be used depending on the nature of the sample. For example, the D90 value of powders may conveniently be measured by digital image analysis (such as using a Camsizer XT), the D90 value of particles comprised within a fat continuous material such as chocolate may be measured by laser light scattering and the particle size distribution of fat droplets within a solid matrix may be measured by microscopy and image analysis.

The particles comprised within the composition of the present invention may be approximately spherical, for example they may have a sphericity of between 0.8 and 1. The use of spherical particles allows lower fat contents to be used in the fat-continuous phase without increasing viscosity. In an embodiment where a low saturated fatty acid content fat is present inside the particles and a fat comprising higher levels of saturated fatty acid is present in the continuous fat phase, the ability to reduce the quantity of fat in the continuous phase allows a greater reduction in the overall saturated fatty acid content of the food composition on a total fat basis. Spherical particles allow higher packing fractions than irregularly shaped particles due to reduced steric interactions between the particles. For the same particle-size distribution and fat content, spherical particles provide a smoother mouth-feel.

However, even when broken up, such as by refining, the porous amorphous particles according to the composition of the invention dissolve rapidly and so are less noticeable in the mouth than the equivalently sized crystalline material. An embodiment of the invention provides a food composition having a saturated fatty acid content of less than 45 wt. % on a total fatty acid basis. In this context, the quantity of (saturated) fatty acids includes fatty acids that are part of fat molecules, indeed it is not expected that the food composition of the invention would have an appreciable level of free fatty acids.

Sphericity=$4\pi A/P^2$ wherein A is defined as the measured area covered by a particle projection and P is the measured perimeter of a particle projection. Sphericity may for example be measured by a Camsizer XT.

For instance, an ideal sphere would have an expected sphericity of 1. It is to be commonly understood however that a high degree of sphericity can still be achieved with values less than 1. For example a value between 0.6 and 1 for an object or particle would be considered substantially spherical.

The particles comprised within the composition of the present invention may be obtained from an oil-in-water emulsion by foam drying, freeze drying (for example freeze drying a spray), tray drying, fluid bed drying and the like. Preferably the amorphous porous particles are obtained by spraying and drying, for example spray drying with pressurized gas injection.

The spray in a spray drier produces droplets that are approximately spherical and can be dried to form approximately spherical particles. However, spray driers are typically set to produce agglomerated particles, as agglomerated powders provide advantages as ingredients in terms of flowability and lower dustiness, for example an open top spray drier with secondary air recirculation will trigger particle agglomeration. The agglomerated particles may have a particle size distribution D90 of between 120 and 450 µm. The size of spray-dried particles with or without agglomeration may be increased by increasing the aperture size of the spray-drying nozzle (assuming the spray-drier is of sufficient size to remove the moisture from the larger particles). The particles comprised within the composition of the invention may comprise un-agglomerated particles, for example at least 80 wt. % of the particles comprised within the composition of the invention may be un-agglomerated particles. The particles comprised within the composition of the invention may be particles (for example agglomerated particles) which have been refined.

Refining particles comprising fat droplets dispersed within an amorphous continuous phase, for example by roll refining, will result in some liberation of the fat droplets. If the particles are to be refined together with the continuous fat phase, the composition of the continuous fat phase should be adjusted accordingly to compensate. Advantageously, the particles of the invention retain internal fat droplets and closed porosity (if initially present) during harsh processing conditions such as those experienced during the manufacture of confectionery products such as chocolate, or fillings. For example the particle size of agglomerated particles described above may be reduced by roller refining whilst still retaining much of their original fat droplets (and closed porosity if present). For example, after refining the particles may retain at least 20%, 30%, 40% or 50% of their initial fat droplets.

When formed into agglomerates, the agglomerated particles generally retain convex rounded surfaces composed of the surfaces of individual spherical particles. Refining spherical or agglomerated spherical particles causes fractures in the particles which leads to the formation of non-rounded surfaces. The refined particles according to the composition of the invention may have less than 70% of their surface being convex, for example less than 50%, for further example less than 25%.

After refining, less than 30% of the particles may be substantially spherical, for example less than 20% may be substantially spherical, for example less than 10% may be substantially spherical, for example less than 5% may be substantially spherical, for example essentially none of the particles may be substantially spherical.

The amorphous continuous phase of the particles according to the present invention may comprise (for example consist on a dry basis of) sucrose and skimmed milk, for example where the sucrose is present at a level of at least 30 wt. % in the amorphous continuous phase. The ratio of sucrose to skimmed milk may be between 0.5 to 1 and 2.5 to 1 on a dry weight basis, for example between 0.6 to 1 and 1.5 to 1 on a dry weight basis. The skimmed milk may have a fat content below 1.5 wt. % on a dry weight basis, for example below 1.2 wt. %. The components of skimmed milk may be provided individually and combined with sucrose, for example amorphous continuous phase of the particles may comprise sucrose, lactose, casein and whey protein. Sucrose and skimmed milk provide an amorphous porous particle which has good stability against recrystallization without necessarily requiring the addition of reducing sugars or polymers. For example the particles according to the invention may be free from reducing sugars (for example fructose, glucose or other saccharides with a dextrose equivalent value. The dextrose equivalent value may for example be measured by the Lane-Eynon method). For further example the particles according to the invention may be free from oligo- or polysaccharides having a three or more saccharide units, for example maltodextrin or starch.

The particles according to the composition of the present invention may be free from ingredients not commonly used by consumers when preparing food in their own kitchen, in other words, the particles according to the composition of the present invention may consist of so-called "kitchen cupboard" ingredients.

In an embodiment of the composition of the invention where the particles according to the composition of the invention comprise (for example consist on a dry basis of) sucrose and skimmed milk, increasing the proportion of skimmed milk to sucrose reduces the amount of sucrose in the overall composition. This can be advantageous, as many consumers would welcome a good tasting food composition with reduced sugar content, and appreciate a high milk content. Reducing the proportion of sucrose in the particles reduces their sweetness directly, but it also reduces the dissolution speed of the particles which further reduces sweetness impact in the mouth. However, by increasing the porosity of the particles, in particular the closed porosity of the particles, the dissolution speed can be increased so counteracting the reduction of sweetness. The invention may provide a food composition comprising a dispersion of particles in a continuous fat phase, the particles comprising fat droplets dispersed within an amorphous continuous phase, wherein the solid fat content of the droplets is less than 25%, the composition comprising 5 to 60% (for example 20 to 55%) of particles wherein said particles have a moisture content of between 1% and 5% (for example between 2% and 3%), comprise sucrose and skimmed milk at a level of at least 95% of the particles on a dry basis (for example at least 98%) and have a ratio of sucrose to skimmed milk between 0.5:1 and 0.6:1. The particles may have a D90 particle size distribution of between 25 and 90 microns, for example between 40 and 80 microns. The particles may comprise between 10 and 60% closed porosity (for example between 20 and 40% closed porosity).

The food composition of the invention may have a low moisture content, for example less than 2.5% water by weight, for example less than 1% water by weight. Food ingredients that are completely free from moisture are rare, but the composition of the invention may be essentially free from water.

The food composition of the invention may be a confectionery composition, for example chocolate, an ice-cream component or a fat-based confectionery filling such as a sweet filling for a pastry, biscuit, extruded cereal, or moulded chocolate product. The food composition of the invention may be an ice-cream coating. The food composition of the invention may have a soft texture. The food composition according to the invention may be a fat-based spread, for example a sweet fat-based spread such as spread comprising cocoa and/or nuts and/or milk. The food composition according to the invention may be a fat-based spread comprising an ingredient selected from the group consisting of nut oils, fish oils, algal oils, stanols, sterols and combinations of these.

The fat droplets dispersed within the amorphous continuous phase of the particles according to the invention may comprise an oil selected from the group consisting of high oleic oils (e.g. high oleic sunflower oil, high oleic safflower oil, high oleic soybean oil, high oleic rapeseed oil such as high oleic canola oil, high oleic algal oil), olive oil, nut oils (e.g. macadamia nut oil, hazelnut oil, walnut oil, almond oil), avocado oil, sunflower oil, rapeseed oil, soybean oil, grape-seed oil, cotton-seed oil, corn oil, olein fraction of cocoa butter and combinations of these. For example the fat droplets dispersed within the amorphous continuous phase of the particles according to the invention may comprise an oil selected from the group consisting of high oleic oils, nut oils, rice bran oil, mustard seed oil, algal oil, fish oil and combinations of these. The fat droplets dispersed within the amorphous continuous phase of the particles according to the invention may comprise medium chain triglycerides. Medium chain triglycerides (MCT) according the current invention are triglycerides where two or three of the fatty acids on the glycerol backbone are medium chain fatty acids having 6-12 carbon atoms. Encapsulation of MCT can avoid fat migration and fat bloom. The fat droplets may further comprise fat-soluble vitamins such as vitamin A. In an embodiment, the fat droplets dispersed within the amorphous continuous phase of the particles according to the invention may comprise a flavoured oil, for example a natural flavoured oil. The fat droplets may further comprise essential oils such as citrus oils.

The fat comprised in the continuous fat phase of the food composition according to an embodiment of the invention may be selected from the group consisting of shea butter, kokum butter, sal butter, cocoa butter, palm oil and combinations of these. The fat comprised in the continuous fat phase of the food composition according to an embodiment of the invention may be a fraction (for example an olein fraction) of a fat selected from the group consisting of shea butter, kokum butter, sal butter, cocoa butter, palm oil and combinations of these. The fat droplets dispersed within the amorphous continuous phase of the particles according to the invention may comprise an olein fraction of cocoa butter and the fat comprised in the continuous fat phase of the food composition may comprise cocoa butter (for example a stearin fraction of cocoa butter). By adding cocoa butter olein within particles dispersed in a chocolate or cocoa butter based filing, the overall saturated fatty acid content (on a total fat basis) can be reduced. As the cocoa butter olein is trapped within the particles it does not lead to problems of softening, poor crystallization or oil migration.

In an embodiment, the food composition of the invention may comprise partially aggregated proteins. The partially aggregated proteins may comprise proteins selected from the group consisting of soy proteins (for example soy glycinin, for further example conglycinin), egg proteins (for example ovalbumin, for further example ovaglobulins), rice proteins, almond proteins, oat proteins, pea proteins, potato proteins, wheat proteins (for example gluten), milk proteins (for example whey protein, for further example casein) and combinations of these. The proteins may have been partially aggregated by a heat treatment at a temperature between 85° C. and 100° C. for a period of between 50 and 400 seconds and a pH of between 5.8 and 6.2. The partially aggregated proteins may be in the form of protein aggregates dispersed within the amorphous continuous phase of the particles. The partially aggregated proteins enhance a smooth and creamy texture of the food composition.

In the context of the present invention the term partially aggregated proteins means that a proportion of the proteins have been aggregated. The content of soluble protein after the aggregation process is preferably below or equal to 30%, preferably below or equal to 20% in relation to the total protein content; the majority of the proteins being embedded in aggregated structures.

A further aspect of the invention provides a process for manufacturing a food composition comprising the steps of
a) forming an oil-in-water emulsion comprising fat, a sweetener, a bulking agent and a colloid stabilizer;
b) optionally subjecting the emulsion to high pressure, preferably 50 to 300 bar, more preferably 100 to 200 bar;
c) optionally adding gas to the emulsion;
d) spraying and drying the emulsion to form particles comprising a continuous amorphous phase and dispersed fat droplets; and
e) mixing the particles with a second fat.

The oil-in-water emulsion formed in step a) may be formed by mixing fat, a sweetener, a bulking agent and a colloid stabilizer (for example an emulsion stabilizer) with water, wherein the water comprises between 30 and 70 wt. % of the mixture, for example between 40 and 60 wt. % of the mixture. Mixing should continue until all the water-soluble ingredients have dissolved. The sweetener bulking agent and colloid stabilizer may be as described for the composition of the invention. In an embodiment, the sweetener is sucrose and the bulking agent is selected from the group consisting of lactose, maltose, maltodextrins, soluble wheat or corn dextrin (for example Nutriose®), polydextrose, soluble fibre such as Promitor® and combinations of these. For example, the sweetener may be sucrose and the bulking agent may be selected from the group consisting of lactose, maltose and combinations of these. The colloid stabilizer may be a surfactant, for example the colloid stabilizer may be selected from the group consisting of pea proteins, potato proteins, wheat gluten, soy proteins, egg albumin proteins, milk proteins and combinations of these. The bulking agent and colloid stabilizer may be comprised in skimmed milk powder, for example as lactose and casein. The food composition manufactured according to the process of the invention may be free from oligo- or polysaccharides having a three or more saccharide units, for example free from maltodextrin or starch. The emulsion may be formed by any of the emulsification techniques known in the art. For example a high shear mixer may be used to form the emulsion.

In an embodiment, the oil-in-water emulsion formed in step a) may be formed by dispersing or dissolving protein selected from the group consisting of pea proteins, potato proteins, wheat gluten, soy proteins, egg albumin proteins, milk proteins and combinations of these in water and adding a fat having a solid fat content less than 25% at 20° C. whilst mixing (for example using high pressure homogenization) to form an oil in water emulsion, and then adding components comprising a sweetener and a bulking agent, for example skimmed milk powder and sucrose. For example, the oil-in-water emulsion formed in step a) may be formed by dispersing or dissolving protein selected from the group consisting of pea proteins, potato proteins, wheat gluten, soy proteins, egg albumin proteins, milk proteins and combinations of these in water and adding a fat having a solid fat content less than 25% at 20° C. whilst mixing (for example using high pressure homogenization) to form an oil-in-water emulsion comprising between 1 and 6 wt. % protein and between 10 and 30 wt. % fat, and then adding components comprising a sweetener and a bulking agent, for example skimmed milk powder and sucrose.

In an embodiment, the oil-in-water emulsion formed in step a) may be formed by dispersing whey protein (for example whey protein isolate) in water and adding a fat having a solid fat content less than 25% at 20° C. whilst mixing (for example using high pressure homogenization) to form an oil in water emulsion, optionally heating the emulsion to between 75 and 90° C. to stabilize the whey protein around the oil droplets, and then adding components comprising a sweetener and a bulking agent, for example skimmed milk powder and sucrose.

The spraying and drying of step d) of the process of the invention may be a combination of forming a spray and then drying the spray droplets by a method selected from the group consisting of air column drying, freeze drying, fluid bed drying and combinations of these. The spray may be frozen, for example in liquid nitrogen, and then dried by freeze drying. The spraying and drying of step d) of the process of the invention may be spray drying.

The particles may be mixed with a second fat in step e) so as to be dispersed in the continuous fat phase of a food composition. The particles may be coated, for example they may be film coated or they may be coated in a thin layer of fat such as cocoa butter. A thin coating layer further enhances the stability of the particles during transport and storage. In an embodiment, particles having porosity (for example closed porosity) may be formed, the emulsion being subjected to high pressure in step b) and gas added to the emulsion in step c). The colloid stabilizer aids in the formation and stabilization of porosity, for example closed porosity.

The emulsion may be subjected to a high pressure, for example a pressure greater than 2 bar, typically 50 to 300 bar, preferably 100 to 200 bar, more preferably 100 to 150 bar.

The gas is preferably dissolved in the emulsion before spraying, the emulsion comprising dissolved gas being held under high pressure up to the point of spraying. Typically the gas is selected from the group consisting of nitrogen, carbon dioxide, nitrous oxide and argon. The gas may be air. For example the gas may be nitrogen and it is added for as long as it takes to achieve full dissolution of gas in the said mixture. For example the time to reach full dissolution may be at least 2 minutes, for example at least 4 minutes, for further example at least 10 minutes, for further example at least 20 minutes, for further example at least 30 minutes.

For example, a solution of between 15 and 30 wt. % (for example 24.5 wt. %) sucrose, between 6 and 10 wt. % skimmed milk powder (for example 10.5 wt. %), between 5 and 25 wt. % high oleic sunflower oil (for example 15 wt. %) and 50 wt. % water is mixed with a polytron PT3000D mixer until full dissolution of the sucrose and skimmed milk powder at room temperature with a speed rate between 6000 and 12000 rpm. An emulsion forms. The emulsion is transferred to a vessel at controlled temperature (for example 55° C.) and is then pumped at 100-130 bar. High pressure nitrogen is injected at 0.5-2 NL/min for at least 10 mins or a least until full dissolution of the gas in the solution is achieved. After a pre-heating at 60° C., the solution is spray-dried using a one-stream closed-top spray drier. Amorphous particles are obtained with a sphericity greater than 0.8 and comprising both oil droplets and closed porosity. These particles may be added to a chocolate mass after refining.

In an embodiment, the fat comprised in the emulsion of step a) has a solid fat content at 20° C. of less than 25% (for example less than 10%) and the second fat with which the particles are mixed in step e) has a solid fat content at 20° C. of greater than 30%. The fat comprised in the emulsion of step a) may be selected from the group consisting of high oleic oils (e.g. high oleic sunflower oil, high oleic safflower oil, high oleic soybean oil, high oleic rapeseed oil such as high oleic canola oil, high oleic algal oil), olive oil, nut oils (e.g. macadamia nut oil, hazelnut oil, walnut oil, almond oil), avocado oil, sunflower oil, rapeseed oil, soybean oil, grape-seed oil, cotton-seed oil, corn oil, olein fraction of cocoa butter and combinations of these. For example the fat comprised in the emulsion of step a) may be selected from the group consisting of high oleic oils, nut oils, rice bran oil, mustard seed oil, algal oil, fish oil and combinations of these. The fat may further comprise fat-soluble vitamins such as vitamin A.

The mix obtained by mixing the particles with a second fat in step (e) of the process of the invention may be refined, for example it may be roll-refined. It is advantageous that the porosity of the particles according to an embodiment of the invention is able to survive size reduction processes used in fat-based confectionery manufacture. Pores of approximately spherical shape provide a strong structure to the particles and having multiple small closed pores means that the particles can be fractured without significant loss of internal porosity.

The mix obtained by mixing the particles with a second fat in step e) of the process of the invention may be further mixed with an ingredient selected from the group consisting of roasted cocoa, milk powder, crystalline sucrose, hazelnuts and combinations of these. In an embodiment of the process of the invention, an ingredient selected from the group consisting of roasted cocoa, milk powder, crystalline sucrose, hazelnuts and combinations of these may be mixed with fat and refined, for example in a roll-refiner to form a fat mixture, and then this fat mixture may be combined in step e) with un-refined particles formed in step d).

The process of the invention may further comprise the step of filling the food composition into moulds, for example where the composition is a confectionery filling it may be deposited as a centre in a chocolate shell-moulding process. The composition may be combined with extruded cereal, for example co-extruded as a filling in a cereal tube which may be crimped to form cereal pillows. The composition after aeration may be laminated between wafer sheets, for example to form a wafer "book".

In a further aspect the present invention also provides for a food composition obtained (for example obtainable) by the process of the invention.

In a still further aspect the present invention provides an edible powder comprising (for example consisting of) particles comprising fat droplets dispersed within an amorphous continuous phase, wherein the solid fat content of the droplets is less than 25%. The term "edible" is used in the context of the present invention to mean substances which can be eaten safely. Whilst the current invention is not limited to substances permitted for consumption in any particular jurisdiction, edible compositions may for example comprise materials approved for human consumption by the U.S. Food and Drug Administration. In an embodiment, the invention provides for the use of an edible powder for reducing fat migration in composite confectionery products, wherein the powder comprises (for example consists of) particles comprising fat droplets dispersed within an amorphous continuous phase, wherein the solid fat content of the droplets is less than 25%. Features described for the particles dispersed in the continuous fat phase of the food composition of the invention may also apply to the particles comprised within the edible powder. For example, the invention may provide an edible powder comprising particles, the particles comprising fat droplets dispersed within an amorphous continuous phase comprising sucrose and skimmed milk, wherein the solid fat content of the droplets is less than 25% (for example at 20° C.) (for further example less than 10% for example at 20° C.) and the fat droplets comprise omega-3 fatty acid moieties. Such an edible powder may be a component of an infant formula powder.

In a still further aspect, the invention provides for the use of particles comprising fat droplets dispersed in an amorphous continuous phase, the amorphous continuous phase comprising a sweetener, a bulking agent and a surfactant, to reduce the sucrose content and/or the saturated fatty acid content (for example on a total fat basis) of a fat-continuous confectionery product. The fat droplets may have a solid fat content of less than 25%, for example less than 10%. Due to the enhanced sweetness of the particles, they may be used to reduce sucrose in sweet food products.

In a still further aspect, the invention provides an edible powder, the powder comprising (for example consisting of) particles comprising fat droplets and an amorphous continuous phase, the fat droplets being dispersed in the amorphous continuous phase and having a solid fat content of less than 25% (for example at 20° C.) (for further example less than 10% for example at 20° C.), wherein the amorphous continuous phase comprises sucrose, a bulking agent and a colloidal stabilizer (for example a surfactant). The fat droplets may be dispersed directly in the amorphous continuous phase. The amorphous continuous phase of the particles may be porous, for example it may have a closed porosity of between 10 and 60%.

Those skilled in the art will understand that they can freely combine all features of the present invention disclosed herein. In particular, features described for the composition of the present invention may be combined with the process of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

EXAMPLES

Example 1: Preparation of Amorphous Particles Containing Fat Droplets

Four emulsions were prepared with sucrose, skimmed milk powder (SMP) and either high oleic sunflower oil (HoSO) [AAK] or palm olein [AAK]. Both HoSO and palm olein have solid fat contents of below 10% at 20° C. Skimmed milk powder comprises casein which acts as a surfactant.

| Samples | A | | B | | C | | D | |
|---|---|---|---|---|---|---|---|---|
| Ingredients (kg) | emulsion | dry matter | emulsion | dry matter | emulsion | dry matter | emulsion | dry matter |
| Sucrose | 3.15 | 63% | 2.45 | 49% | 3.15 | 63% | 2.45 | 49% |
| SMP | 1.35 | 27% | 1.05 | 21% | 1.35 | 27% | 1.05 | 21% |
| HoSO | 0.5 | 10% | 1.5 | 30% | | | | |
| Palm olein | | | | | 0.5 | 10% | 1.5 | 30% |
| Water | 5 | | 5 | | 5 | | 5 | |
| Total | 10 | | 10 | | 10 | | 10 | |

All ingredients were weighed separately and then mixed with a polytron PT3000D mixer until full dissolution at 20-50° C. with a speed rate between 6000 and 12000 rpm. The emulsion was transferred to a vessel at controlled temperature of 20-50° C. After a pre-heating at 20 to 50° C., the solution was spray-dried (NIRO MINOR) using a one-stream closed-top spray drier according to the parameters listed in the table below:

| Spray-drying parameters | |
|---|---|
| Nozzle | Bifluid (diameter 1 mm) |
| Inlet air temperature | 135 deg C. |
| Output temperature | 80 deg C. |
| Drying air volume | 80 m3 |
| Pump pressure | 1 bar |
| Gas injection | 0 NL/min |
| Solution flowrate | 3.5 L/h |

Figure 2:
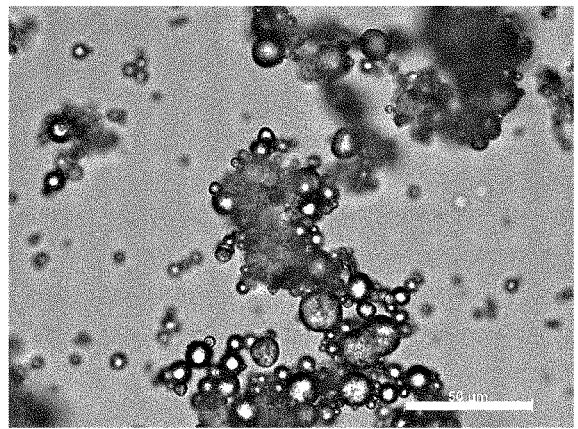
FIG. 2 shows optical light micrographs of the powders of example 1 dispersed in oil. Scale bar is 50 µm.
Figure 2:
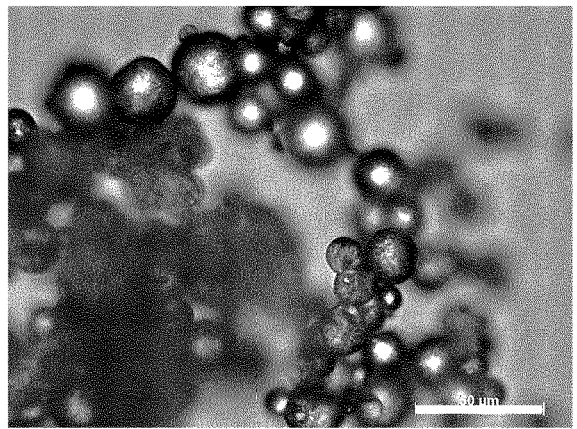
Figure 2:
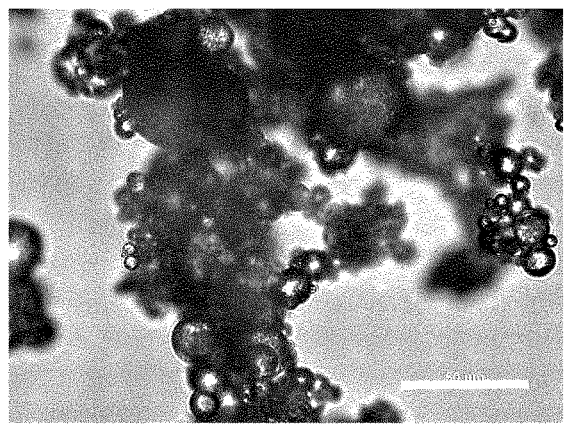
Figure 2:
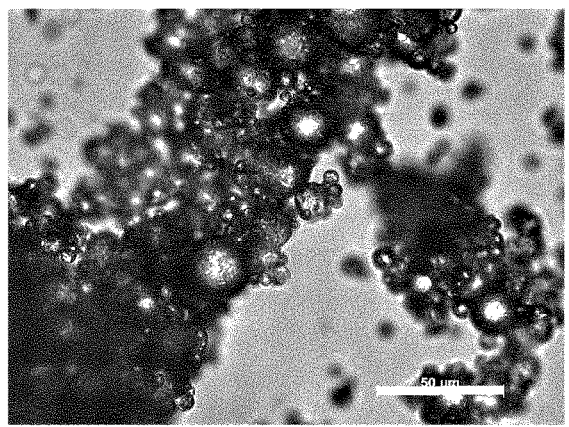
Figure 3:
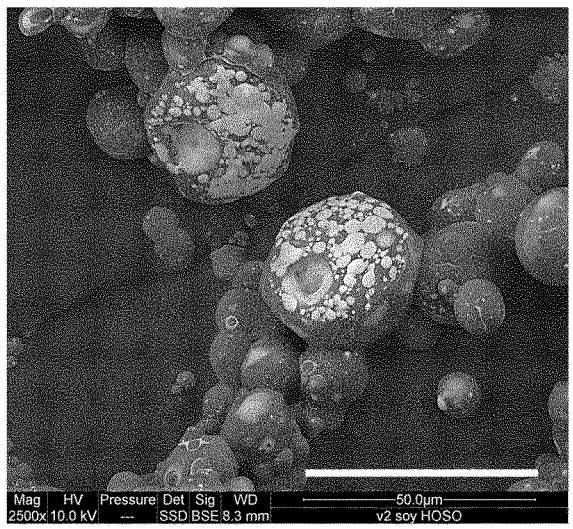
FIG. 3 shows SEM pictures of fractured particles (type B, 30% HoSO) illustrating their internal structure. Scale bars are respectively 20 and 50 µm.
Figure 3:
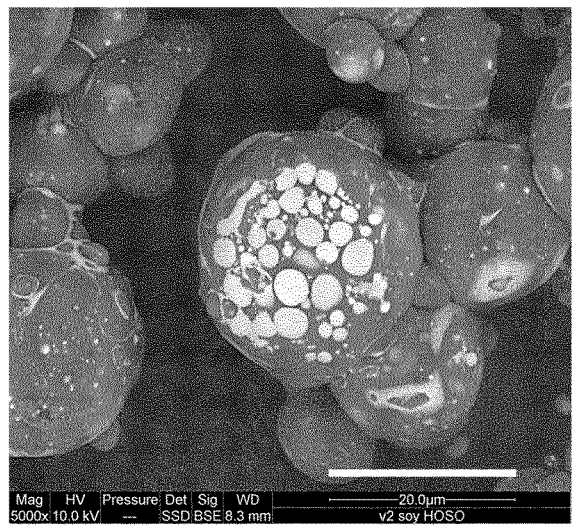

FIG. 1 shows light micrographs of the emulsions before spray drying, and FIG. 2 shows light micrographs of the powders obtained. The fat droplets of the emulsion were retained within particles having an amorphous continuous phase. The particle size distributions of the four powders were measured by laser light scattering, the powders being dispersed in oil for the purposes of the measurement. Sample A had a D90 of 26 µm, sample B had a D90 of 76 µm, sample C had a D90 of 54 µm and sample D had a D90 of 61 µm. FIG. 3 shows SEM pictures of fractured particles (type B, 30% HoSO) illustrating their internal structure. The fat droplets retained in the amorphous continuous phase are clearly visible and appear in white. Powders were glued on a SEM stub using a double sided conductive carbon tape. They were subsequently fractured using a razor blade to reveal their internal structure. Powders were then exposed for a night to 0.1 g Osmium tetroxide vapors to fix and provide contrast to fats. After Osmium tetroxide treatment, samples were subsequently imaged in high vacuum mode at 10 kV using the Backscattered Electron detector of a Quanta F200 Scanning Electron Microscope (FEI company, The Netherlands).

The powders are suitable for adding to a fat-continuous matrix, for example a confectionery filling or chocolate.

Example 2: Preparation of Aerated Amorphous Particles Containing Fat Droplets All ingredients are weighed separately and then mixed with a polytron PT3000D mixer until full dissolution at 20-50° C. with a speed rate between 6000 and 12000 rpm. The coarse emulsion is then passed through a high pressure homogenizer (PANTHER NS3006L) operating under a pressure of 60 bars (at 55° C.). The emulsion is transferred to a vessel at controlled temperature of 55° C. and is then pumped at 100-130 bar. High pressure nitrogen is injected at 0.5-2 NL/min until full dissolution of the gas in the solution is achieved. After a pre-heating at 60° C., the solution is spray-dried (NIRO SD6) using a one-stream closed-top spray drier according to the parameters listed in the table below:

| Spray-drying parameters | |
|---|---|
| Nozzle | Alphanumeric (diameter 0.35) |
| Inlet air temperature | 120 deg C. |
| Output temperature | 85 deg C. |
| Drying air volume | 400 m3 |
| Pump pressure | 130 bars |
| Gas injection | 0.5-2 NL/min |
| Solution flowrate | 12 L/h |

Example 3. Preparation of Amorphous Particles Containing Fat Droplets

Two emulsions were prepared with sucrose, whey protein isolate (WPI), skimmed milk powder (SMP) and either high oleic sunflower oil (HoSO) [AAK] or cocoa butter olein [AAK]. Both HoSO and cocoa butter olein have solid fat contents of below 10% at 20° C.

| Samples | E | | F | |
|---|---|---|---|---|
| Ingredients (kg) | Emulsion | Dry matter | Emulsion | Dry matter |
| Sucrose | 2.8 | 56% | 2.8 | 56% |
| SMP | 1.0 | 20% | 1.0 | 20% |
| WPI | 0.2 | 4% | 0.2 | 4% |
| HoSFO | 1.0 | 20% | | |
| Cocoa Butter olein | | | 1.0 | 20% |
| Water | 5.0 | | 5.0 | |
| Total | 10.0 | | 10.0 | |

First, WPI was hydrated with water for 30 min and oil was added slowly and mixed using a polytron PT3000D mixer until full dissolution at 20-50° C. with a speed rate between 6000 and 12000 rpm. The coarse emulsion was then passed twice through a high pressure homogenizer (PANTHER NS3006L) operating under a pressure of 600-100 bars between 20-50° C. An approximate particle size of 0.5 µm was achieved.

The emulsion was then transferred to a vessel and the WPI around the oil droplets was stabilized by heating at 82° C. for 10 min. Next the sucrose and SMP were added to the emulsion and pasteurized at 75° C. for 5 min. The solution was then spray-dried (NIRO MINOR) using a one stream closed-top spray drier according to the parameters listed in the table below:

| Spray drying parameters | |
|---|---|
| Nozzle | Bifluid (diameter 1 mm) |
| Inlet air temperature | 110° C. |
| Output temperature | 90° C. |
| Pump pressure | 60 bar |
| Gas injection | 0 NL/h |
| Solution flowrate | 6 L/h |

Figure 4:
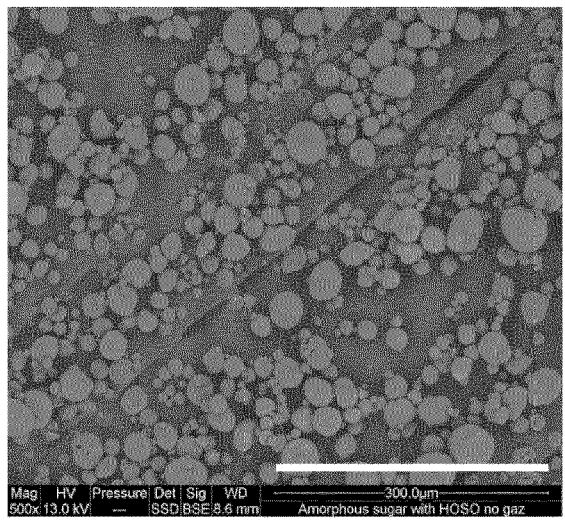
FIGS. 4A&B shows SEM pictures of fractured particles containing fat droplets (HoSO) from Example 3 illustrating the particles' internal structure. Scale bars are respectively 300 and 10 µm.
Figure 4:
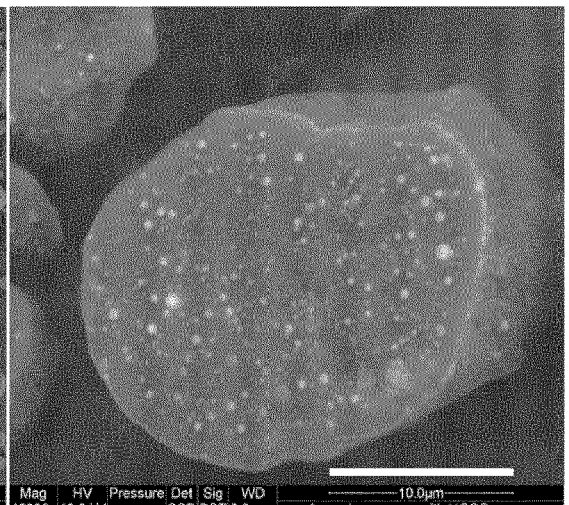
Figure 5:
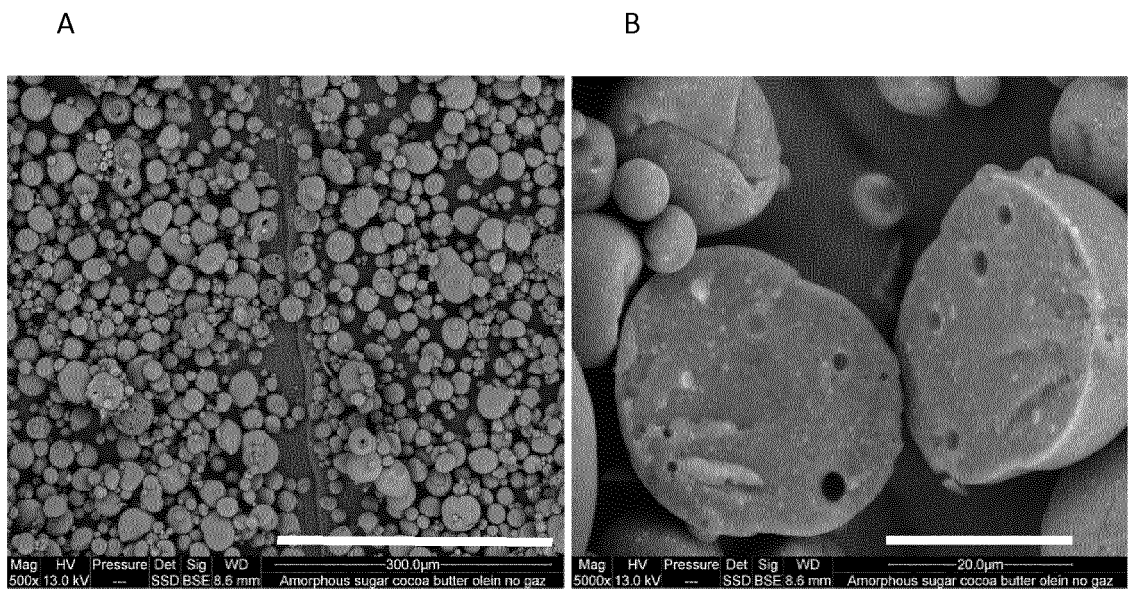
FIGS. 5A&B shows SEM pictures of fractured particles containing fat droplets (cocoa butter olein) from Example 3 illustrating the particles' internal structure. Scale bars are respectively 300 and 20 µm.

FIGS. 4A&B (type E, 20% HoSO) and FIGS. 5A&B (type F, 20% Cocoa butter olein) shows SEM pictures of fractured particles illustrating their internal structure. The fat droplets retained in the amorphous continuous phase are clearly visible and appear in white. Powders were glued on a SEM stub using a double sided conductive carbon tape. They were subsequently fractured using a razor blade to reveal their internal structure. Powders were then exposed for a night to 0.1 g Osmium tetroxide vapors to fix and provide contrast to fats. After Osmium tetroxide treatment, samples were subsequently imaged in high vacuum mode at 10 kV using the Backscattered Electron detector of a Quanta F200 Scanning Electron Microscope (FEI company, The Netherlands).

The powders are suitable for adding to a fat-continuous matrix, for example a confectionery filling or chocolate.

Example 4. Preparation of Aerated Amorphous Particles Containing Fat Droplets Two further emulsions were prepared using the same ingredients and process as described in example 3 (i.e. type E and F). High pressure nitrogen was injected at 2 NL/min in the emulsions until full dissolution of the gas in the solution was achieved. The solutions were then spray-dried (NIRO SD6) using a one-stream closed-top spray drier according to the parameters listed in the table below:

| Spray drying parameters | |
| --- | --- |
| Nozzle | Bifluid (diameter 1 mm) |
| Inlet air temperature | 110° C. |
| Output temperature | 90° C. |
| Pump pressure | 60 bar |
| Gas injection | 2 NL/min |
| Solution flowrate | 6 L/h |

Figure 6:
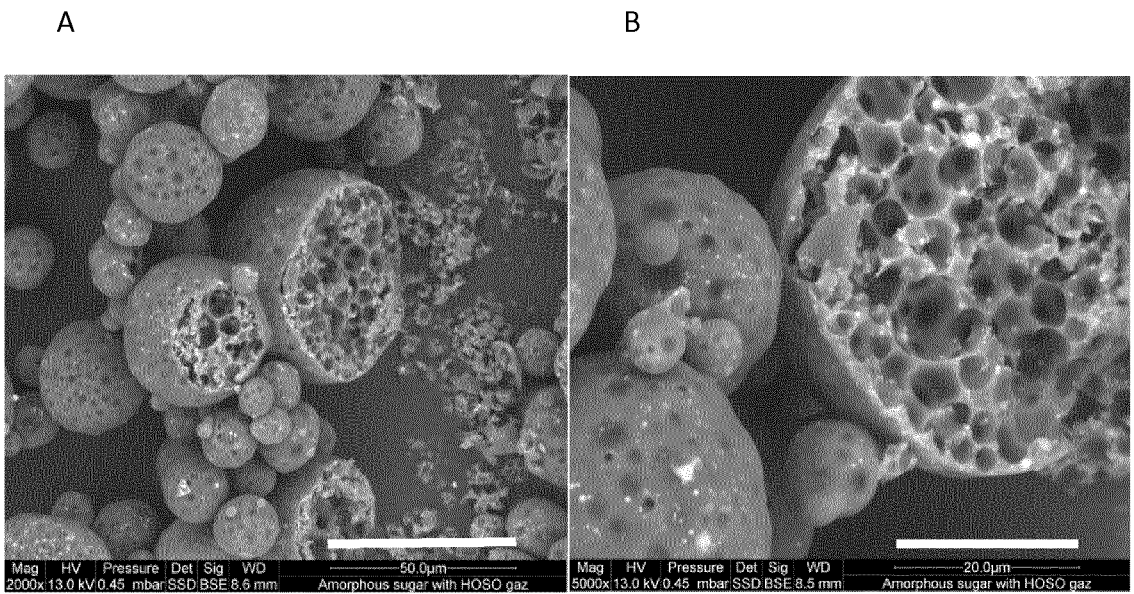
FIGS. 6A&B shows SEM pictures of fractured aerated amorphous particles containing fat droplets (HoSO) from Example 4 illustrating the particles' internal structure. Scale bars are respectively 50 and 20 µm.
Figure 7:
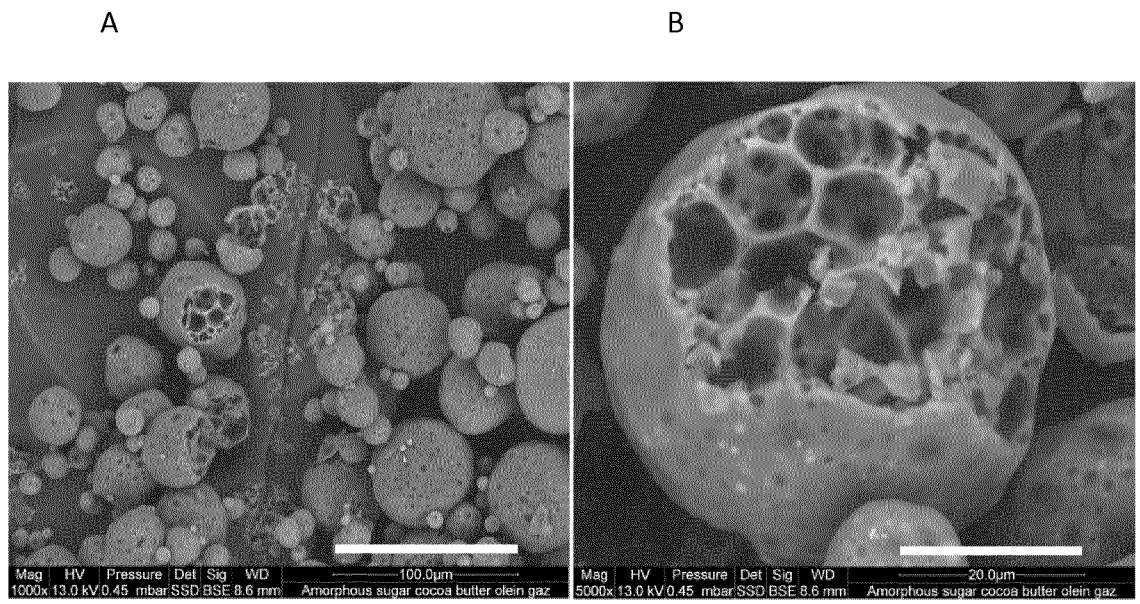
FIGS. 7A&B shows SEM pictures of fractured aerated amorphous particles containing fat droplets (cocoa butter olein) from Example 4 illustrating the particles' internal structure. Scale bars are respectively 100 and 20 µm.

FIGS. 6A&B (type E, 20% HoSO) and FIGS. 7A&B (type F, 20% Cocoa butter olein) shows SEM pictures of fractured amorphous porous particles illustrating their internal structure. The fat droplets retained in the amorphous continuous phase are clearly visible and appear in white along with closed pores. Powders were glued on a SEM stub using a double sided conductive carbon tape. They were subsequently fractured using a razor blade to reveal their internal structure. Powders were then exposed for a night to 0.1 g Osmium tetroxide vapors to fix and provide contrast to fats. After Osmium tetroxide treatment, samples were subsequently imaged in high vacuum mode at 10 kV using the Backscattered Electron detector of a Quanta F200 Scanning Electron Microscope (FEI company, The Netherlands).

The powders are suitable for adding to a fat-continuous matrix, for example a confectionery filling or chocolate.

The invention claimed is:

1. A process for manufacturing a food composition, the process comprising:
   a) forming an oil-in-water emulsion comprising fat, a sweetener, a bulking agent and a colloid stabilizer;
   b) at least one step selected from the group consisting of:
      (i) subjecting the oil-in-water emulsion to a pressure of 50 to 300 bar, and
      (ii) adding a gas selected from the group consisting of nitrogen, carbon dioxide, nitrous oxide, and argon to the emulsion at least until full dissolution of the gas in the emulsion is achieved;
   c) spraying and drying the oil-in-water emulsion to form particles comprising an amorphous continuous phase and dispersed fat droplets; and
   d) mixing the particles with a second fat to obtain the food composition, wherein the food composition has a saturated fatty acid content of less than 45 wt. % on a total fatty acid basis.

2. The process according to claim 1 wherein the fat comprised in the oil-in-water emulsion in step a) has a solid fat content at 20° C. of less than 25% and the second fat with which the particles are mixed in step e) has a solid fat content at 20° C. of greater than 30%.

3. The process according to claim 1, wherein the amorphous continuous phase has a glass transition temperature of at least 40° C.

4. The process according to claim 1, wherein the particles comprise closed porosity.

5. The process according to claim 1, wherein the amorphous continuous phase of the particles comprises sucrose and skimmed milk.

6. The process according to claim 1, wherein the amorphous continuous phase of the particles comprises sucrose and wheat gluten.

7. The process according to claim 1, wherein the food composition is a confectionery composition.

8. The process according to claim 1, wherein the particles have a sphericity of between 0.8 and 1.

9. The process according to claim 1, wherein the dispersed fat droplets comprise an oil selected from the group consisting of high oleic oils, nut oils, rice bran oil, mustard seed oil, algal oil, fish oil, and combinations thereof.

10. The process according to claim 1, wherein the at least one step in step b) comprises both (i) and (ii).

* * * * *